March 4, 1969   T. J. CONRAD ET AL   3,431,046
FLEXIBLE POLYETHYLENE CORNEAL CONTACT LENS
Filed Feb. 14, 1964
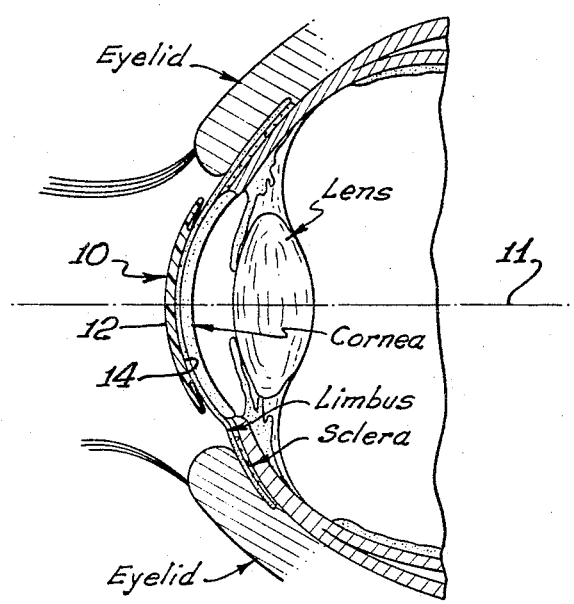
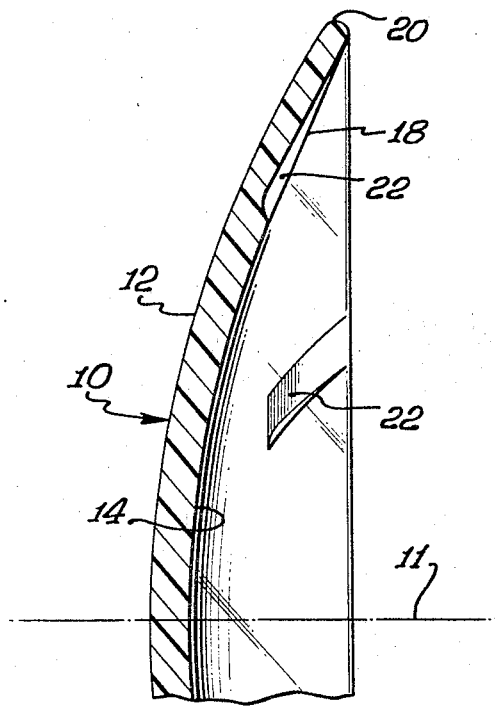
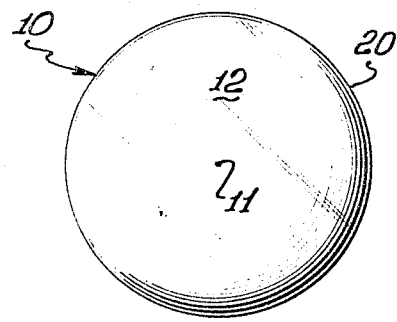
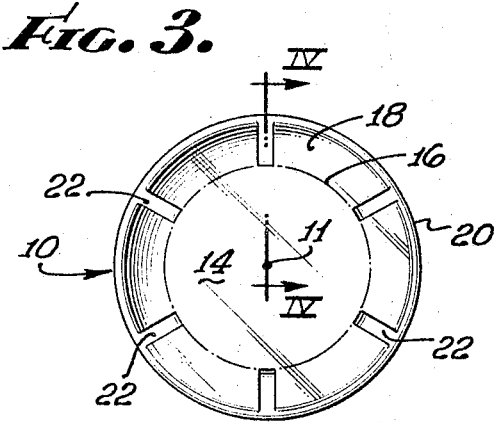
INVENTORS.
TOM J. CONRAD
GLENN O. DAYTON, JR.
MAX ARLIN
BY Miketta and Glenny
ATTORNEYS.

United States Patent Office 3,431,046
Patented Mar. 4, 1969

3,431,046
FLEXIBLE POLYETHYLENE CORNEAL CONTACT LENS
Tom J. Conrad, Venice, and Glenn O. Dayton, Jr., Los Angeles, Calif., and Max Arlin, Boulder City, Nev., assignors to Studies, Inc., Los Angeles, Calif., a corporation of California
Filed Feb. 14, 1964, Ser. No. 345,004
U.S. Cl. 351—160                    1 Claim
Int. Cl. G02c 7/04

ABSTRACT OF THE DISCLOSURE

A corneal contact lens having a generally concave-convex shape, said lens being constructed of a plastic material which is soft, sufficiently transparent and wettable to the tear fluid of the eye to be acceptable in the optical trade, flexible enough to conform to the shape of the eye as the lens moves thereacross, and is lighter than the tear fluid of the eye so that the lens will float on the tear fluid. A method of making a contact lens as described above from polyethylene by heating the polyethylene to a temperature at which said polyethylene becomes amorphous, shaping the amorphous polyethylene to the shape of a corneal contact lens, and quenching the polyethylene while in said shape to a temperature below 150° F. so that the resulting polyethylene has a low degree of crystallinity, thereby imparting clearness to the polyethylene. If it is desired to grind the polyethylene to close tolerances the temperature of the polyethylene should be lowered to below minus 30° F. prior to such grinding. To impart sufficient wettability to the polyethylene the surface of the polyethylene should be oxidized so that said polyethylene is capable of being wetted by the tear fluid of the eye and thereby be attracted to the eye by capillary action.

---

The present invention relates to a flexible corneal contact lens and the method of making the same and more particularly to a corneal contact lens which tends to conform to the shape of the eye upon blinking thereof and also to the method for making such lens.

Recent in the art of contact lenses are lenses that fit only over the cornea portion of the eye. By eliminating the sclera portion of the older type of lenses, the area of pressure of the lens against the eye has been substantially lessened, thereby allowing greater circulation of blood.

The corneal type of lens, however, undergoes a different operation than the older type of lens upon blinking of the eye. Upon blinking, the corneal type of lens tends to move across the eye by the eyelid whereas the older type of lens remained substantially in position even though the eyelids were closed thereacross.

This movement of the corneal lens across the eye upon blinking has presented problems to its use in that upon movement, the corneal lens is removed from the surface of the eye for which it was shaped to a non-conforming surface, thus causing concentrated pressure areas between the lens and the eye. This has been due to the fact that present corneal contact lenses are made of a rigid material which does not tend in any way to conform to the shape of the eye upon a movement thereacross.

Another factor contributing to the discomfort of the wearer upon movement of the lens across his eye is hardness of the material of the lens itself, this hardness being substantially more than the hardness of the cornea of the eye. The result is that the lens portions at the concentrated pressure areas have a digging effect into the eye.

These problems have been overcome by providing a lens which is constructed of a flexible material which will tend to conform to the shape of the eye as it moves thereacross and further by providing a material which is much softer than prior art lenses.

Another advantage gained by employing a flexible material is that in the construction of the corneal lens the manufacturing tolerances have been greatly increased since an exact fit to the eye is not required before the lens feels comfortable to the wearer. Because of the flexibility and softness of the material, the comfort of the lens to the wearer is no longer a major problem so that the prime concern can be turned to fitting a lens which provides the proper optical correction for the eye. However, if close tolerances are required, the present invention contemplates a method of making the lenses to a size which will be within two microns.

Another problem with corneal type contact lenses has been the dropping away of the lens from the eye upon blinking and/or movement of the eye. This has been caused by employing materials having a density which is substantially greater than the tear or lachrymal fluid of the eye thereby making the lens heavy and prone to dropping away from the eye. Another problem associated with employing a heavy material is the tendency of such a material to sink through the tear fluid and come into engagement with the cornea itself which promotes discomfort to the eye. These problems have been overcome by employing a material which is of a lesser density than that of the tear fluid of the eye. A corneal lens constructed of such a material is lighter in weight and is more receptive to capillary attraction to retain the lens adjacent the eye. Further, by constructing the corneal lens of a material lighter than the tear fluid of the eye, the lens will float on the tear fluid and not sink into engagement with the cornea to cause discomfort to the wearer.

One example of a material having these properties is polyethylene. Polyethylene, however, not processed in accordance with the invention is unsuitable for making contact lenses for two reasons: first, polyethylene presents an objectionable hazy or translucent effect which clouds the wearer's vision and second, the waxy and unwettable surface thereof does not allow the lens to sufficiently adhere to the cornea of the eye. The first problem has been overcome by quenching melted polyethylene to less than 150° F. and the second problem has been overcome by oxidizing the surface of the polyethylene. Accordingly, polyethylene, which has suitable properties of flexure and softness, has been utilized by employing a method of construction which ensures clearness of the lens as well as good adhesion qualities.

The present invention has provided a corneal contact lens which is transparent and comfortable to the eye and which will not fall away therefrom, this combination of advantages heretofore being thought impossible to attain.

An object of the present invention is to provide a corneal contact lens which furnishes improved comfort to the wearer thereof.

Another object of the invention is to provide a corneal contact lens which minimizes irritation to the eye upon blinking thereof.

A further object of the invention is to provide a corneal contact lens which will tend to conform to the shape of the eye upon blinking so as to provide improved comfort for the wearer thereof.

A still further object is to provide a corneal contact lens which upon being properly fitted will not fall away from the eye upon movement thereof or blinking thereof.

Still another object is to provide improved capillary action between a corneal contact lens and the eye even though the lens is not an exact fit thereto.

Still a further object is to provide a corneal contact lens which upon a proper fitting will float upon the tear fluid within the eye and thereby promote comfort to the wearer and increase capillary action between the lens and the eye.

Yet another object is to provide a corneal contact lens which can be manufactured with greater tolerances and yet be suitable in the optical trade.

Still a further object is to provide a suitably transparent corneal contact lens which is constructed from polyethylene.

Still another object is to provide a corneal contact lens which is constructed from polyethylene and which will suitably adhere to the eye.

Yet another object is to provide a suitably transparent corneal contact lens which is constructed of polyethylene and which will suitably adhere to the eye.

Still a further object is to provide a method of constructing a suitable corneal contact lens from polyethylene.

Still another object is to provide a method of making corneal contact lenses from polyethylene which are sufficiently transparent and wettable to the tear fluid of the eye to be acceptable in the optical trade.

Still a further object is to provide a method of manufacturing flexible corneal contact lenses which have predetermined dimensions within close tolerances.

Other objects and many of the attendant advantages of this invention will be readily appreciated as the same becomes better understood by a reference to the following detailed description when considered in connection with the accompanying drawings wherein:

FIG. 1 is a vertical cross-section of the human eye, the eyelids and an exemplary corneal contact lens of the present invention;

FIG. 2 is a front view of the contact lens illustrated in FIG. 1;

FIG. 3 is a rear view of the contact lens illustrated in FIG. 1;

FIG. 4 is an enlarged, cross-sectional view of the contact lens taken along line IV—IV of FIG. 3.

Referring now to the accompanying drawing wherein like reference numerals designate like or similar parts throughout the several views, there is shown in FIG. 1 an exemplary corneal contact lens 10 of the present invention being worn over the cornea of the eye, this lens having a marginal size slightly smaller than the limbus of the eye. A preferred shape for the contact lens 10 is circular about an optical axis 11 as shown in FIG. 2, spherically shaped along a convex front surface 12 and spherically shaped along a concave rear surface 14 up to a circle 16 as seen in FIG. 3. At circle 16 a planar surface of revolution 18 which is tangential to the spherical shape of surface 14 is extended up to the periphery 20 of the contact lens so that the surface 18 is slightly raised from the eye. The periphery 20 of the lens is rounded and this feature in combination with the raised surface 18 allows the lens 10 to ride comfortably over the irregular limbus portion of the eye upon blinking.

Grooved within the surface 18 of the contact lens 10 are a plurality of ducts 22 which radially extend toward the optical axis 11 of the lens. The ducts each commence from the periphery 20 of the lens and are channeled in a parallel fashion with respect to the front surface 12 and are curved to terminate at the circle 16. Upon blinking the eye the eyelids will pump an amount of tear fluid through the ducts 22 to recirculate the tear fluid between the contact lens 10 and the cornea, thereby preventing cloudiness and promoting the general well being of the eye. Further, the ducts 22 add to the flexibility of the contact lens and lessen the area of the lens which is in contact with the eye.

The contact lens 10 is to be constructed of a material which is flexible enough to allow the lens to tend to conform to the shape of the eye upon a blinking thereof. Since the radius of the cornea flattens or increases outwardly toward the limbal portion of the eye, the contact lens 10 when moved to this area upon blinking will lie over a non-conforming surface of the eye. This will cause concentrated pressure zones between the contact lens and the eye which are uncomfortable to the wearer. The pressure at these zones will be further increased should the contact lens be moved across the limbal area of the eye where the curvature of the eye substantially changes and is often irregular.

By employing a material which is flexible enough for the contact lens to tend to conform to the shape of the eye, the pressure between the lens and the cornea will be minimized by a yielding of the lens to the eye. The yielding of the lens is further enhanced by employing a material which is relatively soft. It is to be noted that should the contact lens not be an exact fit for the eye, the lens will yield to the eye upon blinking thereof even though the lens is not moved thereacross.

In the preferred embodiment of the invention, the contact lens is to be constructed of a material which is of a lesser density than that of the tear fluid over the eye, the density of tear fluid being slightly greater than one. By such a construction the contact lens will float on the tear fluid of the eye and will not have a tendency to sink through the tear fluid to cut off circulation of the tear fluid and will be lighter than prior art lens on the eye so as to allow greater blood circulation and prevent discomfort to the wearer. Further, by employing a light density material, the contact lens will not drop away upon movement of the eye or a closing of the eyelids since the weight supported by the capillary action between the contact lens and the eye is considerably less than prior art lens. Still further, such a construction makes the contact lens feel lighter to the wearer and thereby is more comfortable.

A material which has been found to be suitable and which provides the flexibility, softness and density aforementioned is polyethylene. The following table is representative of three categories of polyethylene plastic, these categories being based upon the density of the polyethylene:

| Property | Lower density resins | Medium density resins | Higher density resins |
| --- | --- | --- | --- |
| Density at 73° F | .912-.925 | .926-.941 | .942-.965 |
| Modulus of elasticity (tension) | 14,000-38,000 | 35,000-90,000 | 85,000-160,000 |
| Shore hardness (Durometer on the "D" Scale) | 35-60 | 45-65 | 50-75 |
| Rockwell hardness (on the "R" Scale) | | | 30-50 |

Polyethylene is a thermoplastic resin made by the polymerization of ethylene ($C_2H_4$). It is partly crystalline and partly amorphous and its properties depend upon the degree of crystallinity. The density of the polyethylene is an indication of the degree of crystallinity, the lower densities corresponding to lower degrees of crystallinity and the higher densities corresponding to higher degrees of crystallinity. The inner faces between the regions of crystallinity and the amorphous material of the polyethylene cause a scattering of light which gives the polyethylene its hazy or translucent appearance. Further, higher crystallinity causes polyethylene to become less flexible. Accordingly, in most lenses it is desirable to maintain the degree of crystallinity within the polyethylene at a minimum. Polyethylenes which have been found suitable for constructing the lens in accordance with the invention have been Du Pont Polyethylene No. 2315 and Eastman Polyethylene No. 811.

In a preferred embodiment of the invention, the lower density resins as shown in the above chart are preferred; however, it is to be understood that the medium density and the higher density polyethylene come within the scope of the invention because of the significant differences in their characteristics over previously employed materials. For instance, the most commonly used plastic for constructing contact lenses has been the acrylic which in its most flexible state has a tension modulus of elasticity of 350,000 as compared to 160,000 on the high end of the higher density polyethylene and a density of 1.18 as compared to a specific gravity of .965 again for the high end of the higher density polyethylene.

Polyethylene without processing in accordance with the invention is translucent and has a waxy surface which prevents capillary attraction to the eye. It has been found that polyethylene can be made with substantial clearness by first heating the polyethylene to a temperature above 200° F., at which temperature the polyethylene takes on a totally amorphous state, and then quenching the polyethylene in sizes which are within the presently known range of contact lenses to a temperature below 150° F. and preferably below 100° F. A process found suitable for carrying out this effect has been injection molding. By using this method, the crystalline regions will become so minute that the inner faces between the crystalline and amorphous material will not cause refraction effects. It is to be noted that this quenching process of larger blocks of polyethylene, that is, larger than the known range of sizes of contact lenses, will not be as clear and when sufficiently large will lose this effect entirely for all practical purposes since the quenching action does not affect the innermost portions of the block of material.

Another problem to be overcome in using polyethylene is the waxy surface that it inherently has and which prevents it from being wetted by the tear fluid of the eye to provide the capillary action. It has been found that if the surface of the polyethylene contact lens is oxidized, it is wettable by the tear fluid of the eye and thereby will be held in place against the eye by capillary action with this tear fluid.

The following three methods have been found suitable for oxidizing the surface of the polyethylene contact lens: (1) by applying heat thereto with an ordinary flame, (2) by applying heat thereto with an electrical brush flame, and (3) by giving the polyethylene lens an acid bath in a solution of sodium-chromate and hydro-sulphuric acid. The latter method of oxidization has been found to be the most suitable; however, it is important to thoroughly wash off the acid solution from the polyethylene contact lens prior to storage.

Polyethylene constructed lenses are flexible enough that they can be pressed flat by a person's finger, after which they will resume their original shape without any distortion. Further, polyethylene has no memory for its original molecular structure, as do other plastics, and will therefore not seek a former shape after it is molded into a lens.

The present invention also contemplates a further step in the manufacture which will produce contact lenses within very close tolerances. After a lens has been constructed as above described, it can be ground to a size within a two-micron tolerance by freezing the polyethylene lens to a temperature below −30° F., preferably −40° F. This is accomplished by freezing the lens with liquid nitrogen after which normal lens grinding techniques can be employed to obtain the close tolerance.

It is now readily apparent that the present invention provides a contact lens having features and a combination of features which have been thought heretofore impossible to attain in the contact lens art. The present invention has provided a lens which is much more comfortable to the eye than prior art lenses. Further, it provides a contact lens which is considerably more difficult to drop away from the eye than prior art lenses. These desirable features have been attained by constructing the contact lens from polyethylene.

Obviously many modifications and variations of the present invention are possible in light of the above teachings. It is therefore to be understood that within the scope of the appended claim the invention may be practiced otherwise than as specifically described.

We claim:
1. A corneal contact lens, comprising:
    a lens having a generally concave-convex shape and a marginal size slightly smaller than the limbus portion of a human eye;
    said lens being constructed of polyethylene substantially clear;
    said polyethylene having a density less than 1 and less than that of the tear fluid of the eye so that the lens is capable of floating on said tear fluid;
    said polyethylene having a Shore hardness in the range of 35 to 75 on the D scale so that the lens will be soft enough to feel comfortable to the wearer thereof;
    said polyethylene having a tensile modulus of elasticity between 14,000–160,000 so that upon blinking of the eye the lens will flex and tend to conform to the shape of the eye; and
    said polyethylene having an exterior surface which is oxidized so as to be capable of being wetted by said tear fluid, and thereby be attracted to the eye by capillary action.

References Cited

UNITED STATES PATENTS

| | | | |
|---|---|---|---|
| 2,241,415 | 5/1941 | Moulton | 351—162 |
| 3,203,306 | 8/1965 | Lefferts. | |
| 3,221,083 | 11/1965 | Crandon | 351—160 X |
| 3,228,741 | 1/1966 | Becker | 351—160 |
| 3,317,330 | 5/1967 | Livingston et al. | |

FOREIGN PATENTS 802,486   10/1958   Great Britain.

DAVID H. RUBIN, *Primary Examiner.*

U.S. Cl. X.R.

351—177